Aug. 31, 1943.  W. W. FOSTER  2,328,133
PULL LINE DRUM AND MOUNTING
Filed Nov. 21, 1941  2 Sheets-Sheet 1
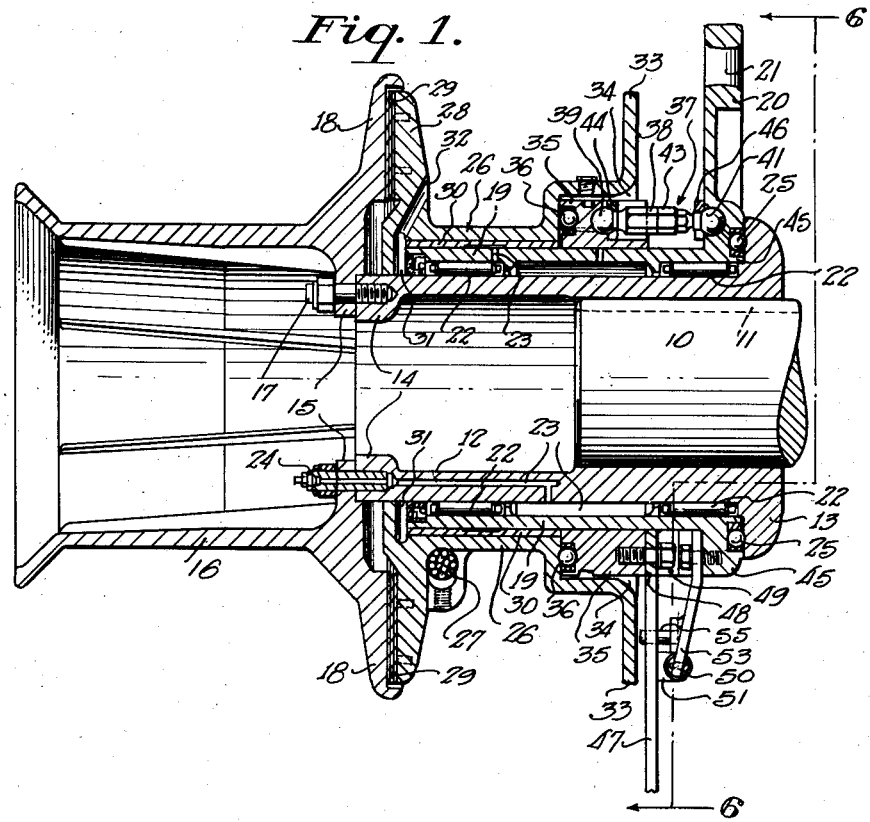
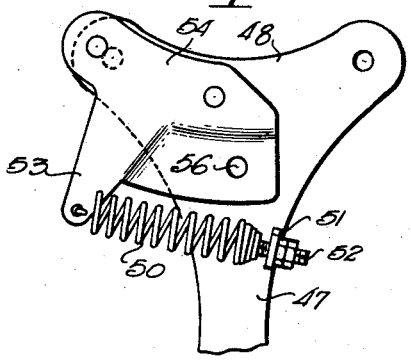
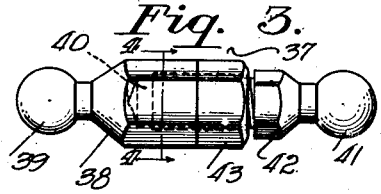
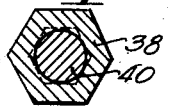
W. W. FOSTER
INVENTOR.
BY
ATTORNEY Aug. 31, 1943.  W. W. FOSTER  2,328,133
PULL LINE DRUM AND MOUNTING
Filed Nov. 21, 1941  2 Sheets-Sheet 2
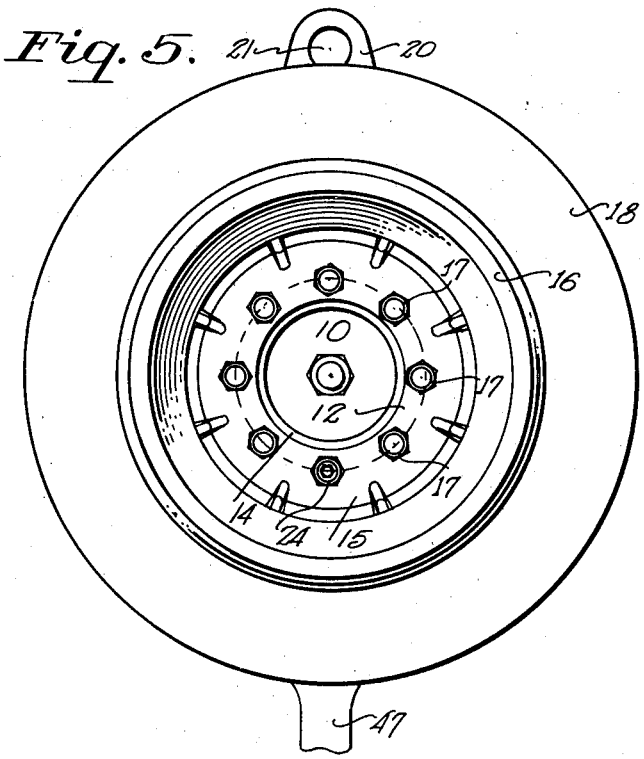
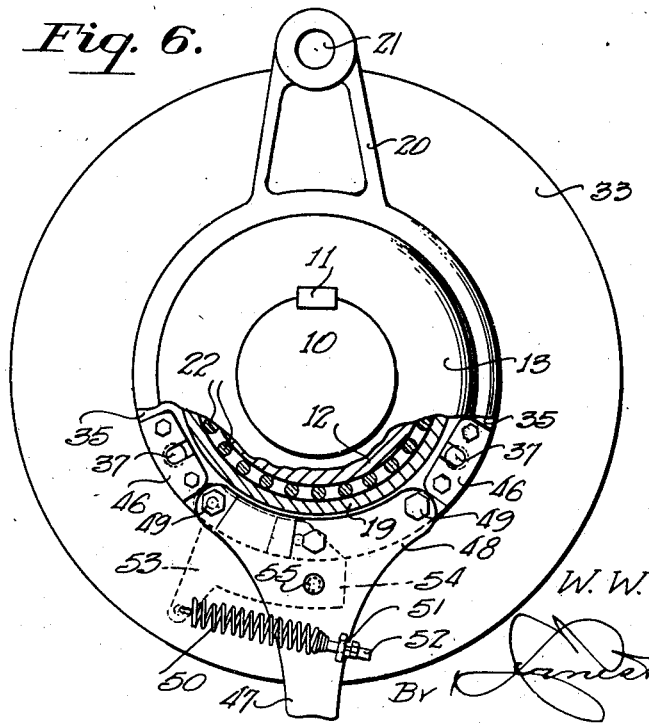
W. W. FOSTER
INVENTOR.
ATTORNEY Patented Aug. 31, 1943

2,328,133

UNITED STATES PATENT OFFICE 2,328,133

PULL LINE DRUM AND MOUNTING

Walter W. Foster, Wichita Falls, Tex.

Application November 21, 1941, Serial No. 419,948

2 Claims. (Cl. 254—185)

This invention relates to wire line spools and catheads and more particularly to catheads employed for making up and breaking out pipe joints such as well casing and tubing.

The principal object of the invention is provide a novel form of drum or cathead mounting whose outstanding characteristic resides in the fact that while the drum is in concentric relation to a constantly rotating shaft and receives its rotation therefrom through cooperating clutch elements, it is moved out of the rotative influence of any revolving element when in inoperative position. This feature of the invention, in eliminating any tendency of the drum to "crawl" or continue to revolve by frictional contact with moving parts, insures the safety of workmen by minimizing hazards caused by undesired winding of the line onto the drum.

Another object of the invention is to provide means, made necessary or desirable by the peculiar form of clutch actuating mechanism employed, to predetermine the frictional setting of the clutch elements. In other words, the clutch actuating mechanism includes coaxially extensible thrust pins independently adjustable and it is to insure uniformity of such adjustments that this latter means is provided.

With the foregoing objects as paramount, the invention has further reference to certain features of accomplishment to become manifest as the description proceeds, taken in connection with the accompanying drawings wherein:

Figure 1 is an elevational view of a drum and mounting in vertical section.

Figure 2 is a fragmentary detail view of the clutch actuating lever and the attendant means for holding the same stationary preparatory to effecting uniform adjustment of the thrust means of the clutch.

Figure 3 is a detail view in elevation of one of the clutch thrust pins.

Figure 4 is a transverse section on line 4—4 on Figure 3.

Figure 5 is a front end view of the cathead and mounting, and

Figure 6 is a rear end view on line 6—6 on Figure 1, showing portions broken away.

In continuing further and in greater detail with the drawings, it is first pointed out that while the invention may find many other uses, it has been primarily designed for setting up and breaking out joints of well pipe and in this connection, it will be observed that the present invention utilizes a form of thrust mechanism for the clutch similar in many respects to that shown in U. S. Patents Nos. 2,062,705 and 2,116,497. However, the thrust mechanism therein shown has been improved upon in that the thrust pins, forming a part of this mechanism and which will be presently described, are designed for extensibility to provide for wear on the clutch parts.

In the drawings, reference numeral 10 denotes a constantly rotating shaft such as a draw works line shaft and upon which is fixed, by means of a key 11, a sleeve 12. The rear end of this sleeve has an integral thrust flange 13, to which reference will be again made later and formed upon its forward end and internally thereof is a bolt flange 14, against which the internal flange 15 of the spool 16 bears. Bolts 17 pass through holes in the flange 15 and are threaded into alined holes in the flange 14 to secure the spool 16 in fixed relation to the sleeve 12 and consequently the shaft 10. The spool 16 has an exterior flange 18 which, as will become apparent presently, forms a part of the friction clutch to be described.

Mounted concentrically on the sleeve 12 is a second sleeve 19 having an integral mounting arm 20 thereon provided with a bolt hole 21 through which a bolt is passed into a suitable support, not shown, and by which the sleeve 19 is held against rotation.

Intermediate the two sleeves 12 and 19, there are provided two sets of roller bearings 22, communicating with which are lubricating ducts 23. The lubricating system of the apparatus is filled by means of the plug 24 which also serves a part of the function of the bolts 17. The rear end of the sleeve 19 is annularly recessed to receive a ball race 25, the balls therein assuming the thrust between the sleeve 19 and flange 13 of the inner sleeve 12 and minimizing friction at this point.

Also in concentric relation to the two sleeves 12 and 19 is a line drum 26 to which is connected and wound the service line 27. The forward end of the drum has a clutch flange 28, complementary to the flange 18 carried by the spool 16 and previously referred to. The flange 28 is faced with suitable brake material 29 which, when the drum 26 is advanced toward the spool 16 to effect engagement between the facing 29 and the face of the flange 18, sufficient friction obtains to secure the drum and spool for common rotation to wind the line 27 on the drum. A bushing 30 surrounds the sleeve 19 between the said sleeve and drum 26, and at the outer end of this bushing an oil recess 31 is provided which communicates with a passage 32 (Fig. 1) in the drum flange 28 and by which excess oil is diverted from the friction lining 29 of the clutch elements.

Opposing the flange 28 of the drum 26 is another and inner flange 33. This flange is so shaped relative to the drum as to define an annular recess 34 to receive a collar 35. This collar is free for limited oscillating movement in the recess and has an annular groove in the face thereof next adjacent the drum 26, which receives a ball race 36 to minimize friction between the collar and drum when the former is urged against the latter in a clutching operation, to be presently described.

The clutching mechanism by which the drum 26 is shifted to bring the flanges 28 and 18 into frictional engagement is comprised of a series of extensible thrust pins 37, one of which is shown in detail in Figure 3. These pins are each comprised of the hexagonal, internally threaded female member 38 having a spherical head 39 and which receives the male member 40, the latter being also provided with a spherical head 41 as well as a hexagonal intermediate section 42 by which it is rotated to effect axial adjustment of the pin. When the proper length adjustment has been obtained, a lock nut 43 is tightened against the hexagonal body 38 to maintain fixed relationship between the members.

The spherical heads 39 of the pins are received in sockets provided in the face of the collar 35 opposite the ball race 39 and held therein by plates 44. The opposite heads 41 of the pins are received in sockets provided in the inner face of a flange 45 on the rear end of the sleeve 26 and held in position by means of plates 46 (Fig. 6). It is apparent therefore that the pins 37, being normally disposed at a variety of relative angles about the sleeve 19, rotation or slight oscillation of collar 35 will be effective to cause the pins to be moved to a position approaching parallel with each other and urging the collar and consequently the drum 26 towards the spool 16 to engage the flanges 12 and 28. This action will of course, secure the drum in rotative engagement with the spool, which is constantly rotating in view of its fixed relation to the shaft 10.

The means by which actuation of the thrust pins, as described, is brought about, is comprised of a lever 47 having a bifurcated end 48 (Figs. 2 and 6) which is secured by means of bolts 49 to the collar 35. By oscillating this lever, similar motion is imparted to the collar 35 which action as stated, tends to move the pins from their relatively inclined positions to a position approaching but not attaining parallel, to shift the drum 26.

Resisting the action of the lever in its operative movements is a spring 50, adjustably connected at one end to a boss 51 on the lever 47, by means of a threaded pin 52 and at its opposite end to an arm 53, integral with a plate 54 bolted to the inner face of the flange 45 of the stationary sleeve 19. This plate 54 and consequently the arm 53, being stationary with the mounting, causes the lever 47, through spring 50 to return to its original inoperative position each time it is actuated, to return the drum 26 also to its inoperative position, out of engagement with the spool 16 and entirely out of the rotative influence of any rotating element. Accordingly, there is no tendency whatever, for the drum to "crawl" or be given to erratic movements common to many types of cable drums when parts are permitted to come into frictional relationship when the drum is required to be idle. This is usually the result of wear but in the present case wear will have no effect in causing the undesirable results hereinbefore expressed.

In order to vary the degree of friction between the friction lining 29 and the surface of the spool flange 18, the thrust pins 37 are adjusted as to length. To increase the friction at this point, the male element 40 is rotated to elongate the pin and after the desired adjustment obtains, the lock nut 41 is secured. Of course, for optimum results, the pins should all be adjusted to identically the same length to insure equalization of pressure throughout the friction area.

Uniformity of thrust pin adjustment is effected by first rotating the clutch lever 47 to a position, against the resistance of spring 50, to shift the drum 26 toward the spool. Then, a pin 55 is inserted into holes 56 (Fig. 2) in the plate 54 and lever 47 which holes will become alined when the thrust pins 37 have attained a position nearly parallel with each other. With the lever 47 thus locked in position by the pin 55, the thrust pins 37 are each adjusted to the same length after which the lock pin 55 is withdrawn from the alined holes 56 to allow the lever to be returned by the spring 50 to its original inoperative position.

It is believed that the foregoing description includes such reference to the cooperation of related parts as to render the operation of the machine as a whole clearly apparent without a separate description of operation.

Manifestly, the construction as shown and described is capable of some modification and such modification as may be construed to fall within the scope and meaning of the appended claims is also considered to be within the spirit and intent of the invention.

What is claimed is:

1. A cable drum and mounting therefor the combination comprising, a constantly revolving shaft, a sleeve mounted on and rotatable with said shaft, a spool fixed to said sleeve having flanges, one of which is perpendicular to the axis of said shaft, a second and flanged sleeve surrounding said first sleeve and held against rotation, a longitudinally slidable drum mounted wholly on said second sleeve, one of the flanges thereof having a surfaced area parallel to and engageable with the flange face of said spool to secure the same in common rotation therewith, said drum further having a circumferential shoulder adjacent its opposite flange to define an annular recess, a collar mounted in said recess for sliding but limited oscillatory movement on said second sleeve, a plurality of normally inclined and axially adjustable thrust pins radially disposed between said collar and the flange of said second sleeve and collectively actuatable toward relatively parallel positions to slidingly move said drum, an apertured lever affixed to and extending radially from said collar for actuating said thrust pins, an arm affixed to the flange of said second sleeve having an aperture alignable with that of said lever to receive jointly therewith a means for maintaining operative position of said lever preliminary to effecting uniformity of length adjustment of said pins, and spring means connecting said lever and arm for returning said lever to inoperative position when actuated.

2. A pull line drum and mounting comprising in combination, a rotating shaft, a sleeve affixed to the end of said shaft for rotation therewith, a second and stationary sleeve floating on said first sleeve having a mounting flange, a flanged drum carrying a pull line and mounted for rotating and limited sliding movement wholly on said sleeve, an annular recess formed adjacent the inner flange of said drum, a collar conformably disposed in said recess, a flanged spool affixed to the end of said first sleeve having a flange whose face is in perpendicular relation to said shaft and parallel with the face of the outer flange of said drum and against which the latter flange is engaged to effect rotation of said drum, a plurality of longitudinally adjustable pins, each having an end connected to said collar with its opposite end connected to the mounting flange of said second sleeve, a lever affixed to said collar for oscillating the same to effect collective movement of said pins toward relative parallel positions to actuate said drum, a plate affixed to said mounting flange having an arm, and spring means connecting said lever and arm to resist movement of said lever.

WALTER W. FOSTER.